June 15, 1965 T. S. KULKA 3,189,173

KIT FOR PROVIDING TAPE AND REEL HOLDING MEANS IN A TAPE REEL BOX

Filed Sept. 11, 1962

INVENTOR

THOMAS S. KULKA

BY Elmer S. Nelson

ATTORNEY

United States Patent Office 3,189,173
Patented June 15, 1965

3,189,173

KIT FOR PROVIDING TAPE AND REEL HOLDING MEANS IN A TAPE REEL BOX

Thomas S. Kulka, 200 Film Bldg., 2108 Payne Ave., Cleveland 14, Ohio

Filed Sept. 11, 1962, Ser. No. 222,779
15 Claims. (Cl. 206—52)

Figures 1, 2, 3, 4, 5, 6, 7:
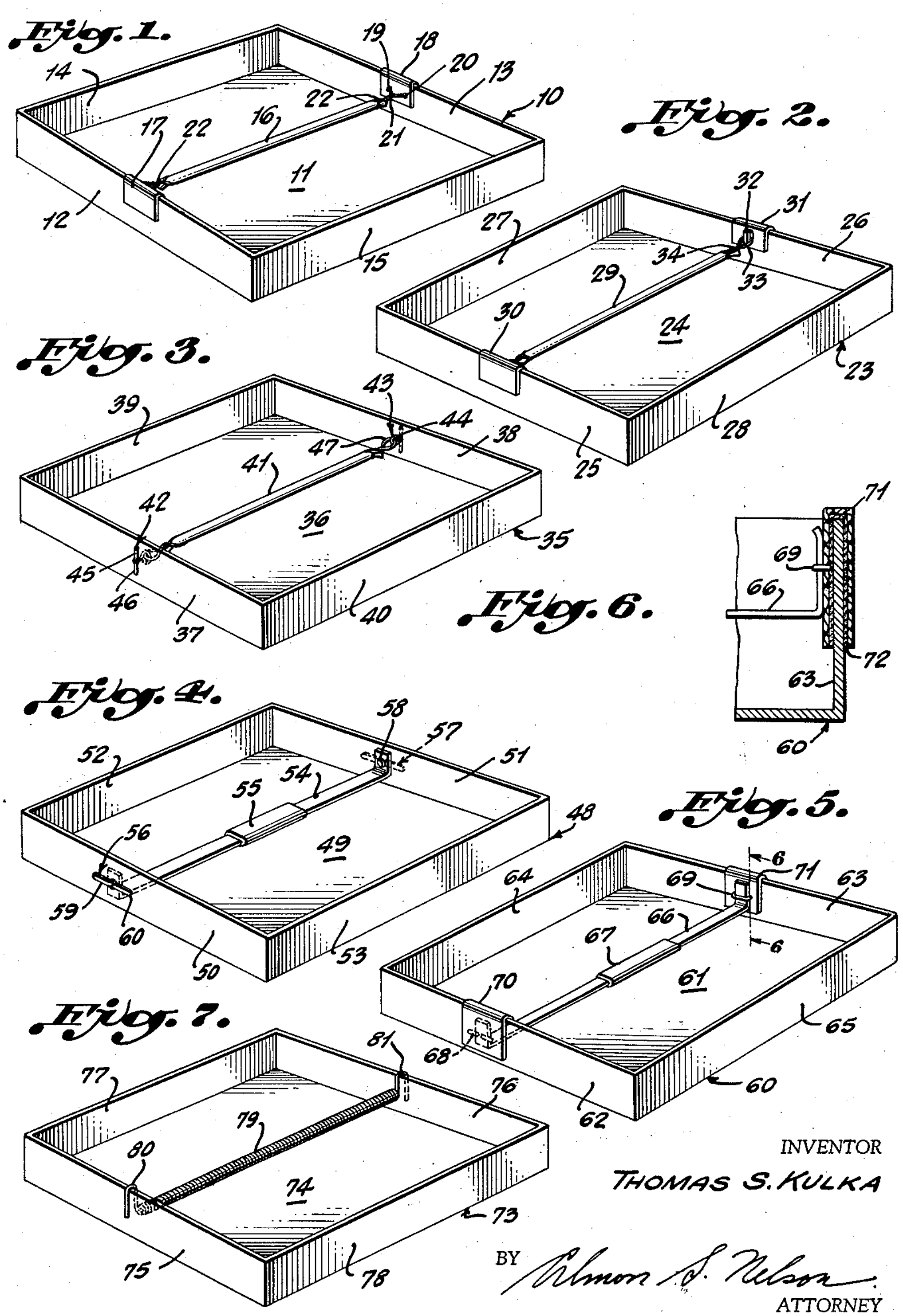

This invention relates to the storage and handling of articles and more particularly to a kit for providing tape and reel holding means in a tape reel box of the type commonly employed for the magnetic recording of sound and the kit of this invention is also usable in connection with video tape and photographic films wound on a reel.

The magnetic recording of sound on tape has become extremely popular within the last few years and as a result problems have arisen in connection with the storage of tape utilized for this purpose, since such tape has a tendency to unwind from the reels on which the same is stored and it is imperative that some means be provided for retaining the tape on the reel without damage thereto and which is conveniently usable and also economical to manufacture and sell. Tape utilized in connection with magnetic recording of sound is normally supplied on plastic reels contained in a box and usually the tape is stored in such box after the recording of sound thereon. It is, therefore, feasible to supply or provide means for retaining the reel in the box to prevent inadvertent removal thereof from the box and also to utilize such means to prevent unwinding of the tape from the reel.

Devices heretofore developed and utilized for accomplishing the above results have included clip means for attachment to the reel to prevent unwinding of the tape therefrom and also have included means incorporated as a permanent part of the box for receiving the reel which operated to retain the reel in the box and also to prevent unwinding of the tape from the reel. While some of these devices were relatively satisfactory, those incorporated as a permanent part of the box did not permit the purchaser any choice as to whether he obtained a tape retaining means or not and furthermore, these devices did not permit application of the same to boxes already in the user's possession and consequently, if the user desired to prevent unwinding of the tape from reels already in his possession, it was necessary to purchase some means to be applied to the reel itself and such means would not prevent inadvertent removal of the reel from the box. Consequently, it is believed that this invention which provides a means for convenient application to existing reel boxes to retain reels therein and prevent unwinding of the tape from the reels represents a significant step forward in the art.

It is accordingly an object of this invention to provide a kit for application to a tape reel box which will operate to retain a reel of tape in the box and, at the same time, prevent unwinding of the tape from the reel.

A further object of the invention is the provision of a kit for application to a tape reel box to retain a reel of tape therein and prevent unwinding of the tape from the reel, which kit will be conveniently applied to the box without cutting, piercing or other modification of the box structure or material.

A further object of the invention is the provision of a kit for application to a tape reel box for retaining a reel of tape therein and for preventing unwinding of the tape from the reel, which kit includes an elastic band having clip means at each end thereof may be conveniently applied to opposite walls of the tape reel box without modification of such walls.

A still further object of the invention is the provision of a kit for application to a tape reel box for retaining a reel of tape therein and for preventing unwinding of the tape from the reel, such kit including an elastic band having fastening means at opposite ends for attachment to opposite walls of the box.

Another object of the invention is a kit for application to a tape reel box for retaining a reel of tape therein and for preventing unwinding of tape from the reel, which kit includes an elastic band having fastening means at opposite ends thereof in the form of cotter pins or paper fasteners which may pierce opposite sidewalls of the box and the legs of the fasteners spread to retain the fasteners and elastic band in position to engage a reel of tape disposed in the box.

A further object of the invention is the provision of a kit for application to a tape reel box for retaining a reel of tape therein and for preventing unwinding of tape from the reel, which kit includes an elastic band having fastening means at opposite ends thereof for attachment to opposite sidewalls of the reel box, which fastening means may comprise a strip of material having an adhesive thereon, such adhesive being of the pressure-sensitive or water-sensitive type.

A still further object of the invention is the provision of a kit for application to a tape reel box for retaining a reel of tape therein and for preventing unwinding of the tape from the reel, which kit includes an elastic band in the form of a coil spring, the ends of the spring terminating in hook elements for application to the sidewalls of a tape reel box to secure the band thereto.

Further objects and advantages of the invention will be apparent from the following description taken in conjunction with the accompanying drawing wherein:

FIG. 1 is a view in perspective showing a kit constructed in accordance with this invention and applied to a conventional tape reel box;

FIG. 2 a view similar to FIG. 1, but showing a slightly modified form of elastic band holding or fastening means;

FIG. 3 a view similar to FIG. 1, but showing the use of cotter pins for retaining the elastic band in the box;

FIG. 4 a view similar to FIG. 1, but showing the use of paper fasteners for securing the elastic band to the sidewalls of the box;

FIG. 5 a view similar to FIG. 1 and showing the use of a strip of material secured to the ends of the elastic band and having an adhesive applied thereto for securing the band to the sidewalls of the box;

FIG. 6 a sectional view taken substantially on the line 6—6 of FIG. 5; and

FIG. 7 a view in perspective showing a further modified form of the invention in which the elastic band is in the form of a coil spring terminating in hook elements for securng the band to the sidewalls of the reel box.

With continued reference to the drawing there is shown in FIG. 1, one form of the kit of this invention and for purposes of illustration, there is shown a conventional tape receiving box 10 which is of conventional construction and which includes a bottom wall 11, sidewalls 12 and 13 and end walls 14 and 15. A conventional cover may be supplied for the box, but is omitted from the drawings for clarity of illustration.

The kit of this invention as shown in FIG. 1 may well comprise an elastic band 16 of a size to be received between the flanges of a tape reel and the band 16 may be formed of rubber or any other suitable resilient material. Secured to opposite ends of the band 16 are strips of sheet metal 17 and 18 and in order to secure such strips to the band 16 there may be provided apertures 19 and 20 and a wire 21 passing through the apertures 19 and 20 is twisted about the end of the band 16, as indicated at 22 in FIG. 1. The strips 17 and 18 may be provided in a flat form and when applied to the box 10, may be bent over to form U-shaped clips as shown in FIG. 1, which serves to engage over the edges of sidewalls 12 and 13 of the box 10 to hold the band 16 in place thereon. If desired, however, the strips 17 and 18 may be pre-formed into U-shaped clips which are merely slipped over the side edges 12 and 13 of the box 10 and will serve to hold the band 16 in place thereon.

In use, a reel of tape is inserted in the box 10 with the resilient or elastic band 16 received between the flanges of the reel and engaging the tape wound thereon which obviously will operate to retain the reel in the box 10 and will also prevent unwinding of the tape from the reel.

In FIG. 2 there is shown a slightly modified form of the invention shown in FIG. 1 and as before, a rectangular reel receiving box 23 is provided with a bottom wall 24, sidewalls 25 and 26 and end walls 27 and 28.

The kit for retaining the reel in the box and preventing unwinding of the tape thereon comprises an elastic band 29 of a size to be received between the flanges of a tape reel and secured to opposite ends of the band 29 are clip forming sheet metal members 30 and 31. As in FIG. 1, the clip members 30 and 31 may be pre-formed as U-shaped clips or may be provided in a flat condition to be bent over the upper edges of the sidewalls 25 and 26 of the box 23 to secure the band 29 therein. The clips 30 and 31 are provided with a loop 32 which may be conveniently formed by stamping out a portion of the metal of the clips 30 and 31 and a wire 33 passes through the loop 32 and is twisted, as at 34, to secure the wire 33 to the end of the elastic band 29.

With particular reference to FIG. 3, there is shown a still further modified form of the invention and as before, the kit is applied to a conventional tape reel receiving box 35 having a bottom wall 36, sidewalls 37 and 38 and end walls 39 and 40.

As before, the kit comprises an elastic band 41 of a size to be received between the flanges of a tape reel and on opposite ends of the band 41 are provided cotter pins 42 and 43. Each cotter pin consists of a loop 44 and bendable legs 45 and 46. At each end of the band 41 a wire 47 is secured thereto and passes through the loop 44 of the cotter pins 42 and 43. In applying the kit of this form of the invention to the box 35, the cotter pins 42 and 43 pierce the sidewalls 37 and 38 of the box 35 and the legs 45 and 46 of the cotter pins 42 and 43 are bent outwardly, as clearly shown in FIG. 3, to secure the cotter pins to the sidewalls 37 and 38 and thus secure the band 41 in place in the box 35.

In FIG. 4 there is shown a still further modified form of the invention which is applied to a conventional tape reel box 48 having a bottom wall 49, sidewalls 50 and 51 and end walls 52 and 53. The kit of this form of the invention may comprise an elastic band 54 which may be of a size to be received between the flanges of a tape reel and may also, if desired, be provided with an enlarged portion 55 intermediate the length thereof to prevent passage of the band 54 between the edges of the tape and the flanges of the reel. It is only necessary to utilize an enlarged portion on the band where a relatively thin band is provided, since as indicated above, a band of sufficient size to prevent passage between the edges of the tape and the flanges of the reel may be utilized. In order to secure the band 54 to the sidewalls 50 and 51 of the box 48, conventional paper fasteners 56 and 57 are secured to opposite ends of the band 54 by passing the fasteners through the band and with the heads 58 of the fasteners 56 and 57 engaging one side of the elastic band 54. The legs 59 and 60 of the fasteners 56 and 57 pierce the sidewalls 50 and 51 of the box 48 and are bent outwardly, as clearly shown in FIG. 4, to secure the band 54 in place in the box.

With particular reference to FIGS. 5 and 6, there is shown a form of the invention which, as before, is applied to a conventional tape reel box 60 having a bottom wall 61, sidewalls 62 and 63 and end walls 64 and 65. The kit of this form of the invention comprises an elastic band 66 which may be of a size to be received between the flanges of a tape reel and may, if desired, be provided with an enlarged intermediate portion 67 which serves to prevent passage of the band 66 between the edges of the tape and the flanges of the reel. Secured to opposite ends of the band 66 by conventional staples 68 and 69 are strips 70 and 71 of flexible material, such as cloth, paper, a suitable plastic material or the like, and applied to one face of each of the strips 70 and 71 is an adhesive as shown at 72 in FIG. 6. This adhesive may be of the pressure-sensitive variety and may be covered with a protective strip of material, not shown, or may be of the water-sensitive variety, but in either case, the adhesive is utilized to secure the strips of material 70 and 71 to the sidewalls 62 and 63 of the box 60 which results in securing the elastic band 66 in place therein.

As shown in FIG. 7, the kit of this invention may take a still further form and as before, a conventional tape reel receiving box 73 having a bottom wall 74, sidewalls 75 and 76 and end walls 77 and 78 is utilized.

The kit in this form of the invention comprises a coil spring 79 which, as shown, terminates at opposite ends in hook portions 80 and 81 which are received over the upper edges of the sidewalls 75 and 76 of the box 73 to secure the band 79 in place therein. While the hook portions 80 and 81 are shown as integral parts of the springs forming the band 79, nevertheless, if desired, the hook portions 80 and 81 may, of course, comprise separate parts secured to the ends of the spring 79 in any suitable or desired manner.

It will be seen that by the above described invention there has been provided a kit in various forms for application to conventional tape reel receiving boxes which may be supplied with such boxes or which may be sold separately to be applied to boxes in the possession of the user and furthermore, the retaining means provided by this kit serve to adequately retain a reel of tape in the tape receiving box and also prevent unwinding of the tape from the reel without damage thereto. The kit of this invention may be constructed from readily available materials in an economical manner to be sold at a comparatively low cost, thereby fulfilling a long felt need of the tape user.

It will be obvious to those skilled in the art that various changes may be made in the invention without departing from the spirit and scope thereof and therefore, the invention is not limited by that which is shown in the drawing and described in the specification, but only as indicated in the appended claims.

What is claimed is:

1. A kit for application to a tape reel box to provide tape and reel holding means, said kit comprising an elastic band of a size to be received between the flanges of a tape reel and a strip of sheet metal secured to each end of said band, said strip being bendable over the edges of opposite sidewalls of a tape reel box to secure said band thereto, each end of the band being secured to said strip at a point well below the upper edge of said strip.

2. A kit as defined in claim 1, in which said strip is in the form of a U-shaped clip.

3. A kit as defined in claim 1, in which each strip is provided with spaced apertures and a wire passing through said apertures and secured to said band serves to secure said band to said strips.

4. A kit as defined in claim 1, in which each strip is provided with a loop and a wire passing through said loop and secured to said band serves to secure said band to said strips.

5. A kit for application to a tape reel box to provide tape and reel holding means, said kit comprising an elastic band of a size to be received between the flanges of a tape reel and a cotter pin secured to each end of said band, each of said pins comprising a loop and legs, a wire passing through the loop of each cotter pin, said wire being secured to said band, said cotter pin being adapted to be pushed through the opposite sidewalls of a tape reel box and the legs bent outwardly to secure said band to the box.

6. A kit for application to a tape reel box to provide tape and reel holding means, said kit comprising an elastic band of a size to be received between the flanges of a tape reel and a split paper fastener secured to each end of said band, said fastener being adapted to be pushed through the opposite sidewalls of a tape reel box and the legs bent outwardly to secure said band to the box.

7. A kit as defined in claim 6, in which said band is provided with an enlarged portion intermediate the length thereof to prevent passage of said band between a side edge of the tape and a flange of the reel.

8. A kit for application to a tape reel box to provide tape and reel holding means, said kit comprising an elastic band of a size to be received between the flanges of a tape reel, a strip of flexible material secured to each end of said band and an adhesive on each strip for securing the same to opposite sidewalls of a tape reel box to secure said band thereto, each end of the band being secured to said strip at a point well below the upper edge of said strip.

9. A kit as defined in claim 8, in which said band is provided with an enlarged portion intermediate the length thereof to prevent passage of said band between a side edge of the tape and a flange of the reel.

10. A kit as defined in claim 8, in which said band is secured to said strip by a staple.

11. A kit as defined in claim 8, in which said adhesive is pressure-sensitive.

12. A kit as defined in claim 8, in which said adhesive is water-sensitive.

13. A kit for application to a tape reel box to provide tape and reel holding means, said kit comprising an elastic band of a size to be received between the flanges of a tape reel and a hook on each end of said band, said hook being adapted to be disposed over the edges of opposite side walls of a tape reel box to secure said band thereto, said hook having an inner and an outer leg, the length of said inner leg being approximately one-half the distance between the flanges of a conventional tape reel.

14. A kit as defined in claim 13, in which said band comprises a coil spring.

15. A kit as defined in claim 13, in which said band comprises a coil spring and said hooks are an integral part of said spring.

References Cited by the Examiner

UNITED STATES PATENTS

| | | | |
|---|---|---|---|
| 254,592 | 3/72 | Beiser. | |
| 555,111 | 2/96 | Norrington. | |
| 584,229 | 6/97 | Mayer. | |
| 1,072,399 | 9/13 | Lyon. | |
| 1,961,137 | 6/34 | De Haan | 206—45.14 |
| 2,760,711 | 8/56 | Weiss | 206—45.14 |
| 2,895,599 | 7/59 | Moyer et al. | 206—62 |
| 2,976,985 | 3/61 | Kraus | 206—80 |

FOREIGN PATENTS

| | | |
|---|---|---|
| 364,022 | 11/22 | Germany. |
| 452,262 | 11/27 | Germany. |

THERON E. CONDON, *Primary Examiner.*

EARLE J. DRUMMOND, *Examiner.*